(12) United States Patent
Whitaker et al.

(10) Patent No.: US 8,189,690 B2
(45) Date of Patent: May 29, 2012

(54) DATA SEARCH, PARSER, AND SYNCHRONIZATION OF VIDEO AND TELEMETRY DATA

(75) Inventors: Sheila G. Whitaker, Gurley, AL (US); Gene A. Grindstaff, Decatur, AL (US); Roger K. Shelton, Huntsville, AL (US); William D. Howell, Athens, OH (US)

(73) Assignee: Intergraph Technologies Company, Las Vegas, NV (US)

( * ) Notice: Subject to any disclaimer, the term of this patent is extended or adjusted under 35 U.S.C. 154(b) by 0 days.

(21) Appl. No.: 12/905,751

(22) Filed: Oct. 15, 2010

(65) Prior Publication Data
US 2011/0090399 A1   Apr. 21, 2011

Related U.S. Application Data

(60) Provisional application No. 61/252,959, filed on Oct. 19, 2009.

(51) Int. Cl.
*H04N 7/12* (2006.01)
(52) U.S. Cl. ......... 375/240.28; 375/240.25; 375/240.26; 348/143
(58) Field of Classification Search ............. 375/240.26, 375/240.25; 348/143
See application file for complete search history.

(56) References Cited

U.S. PATENT DOCUMENTS

| | | | | |
|---|---|---|---|---|
| 5,596,494 | A | 1/1997 | Kuo | 364/420 |
| 5,878,356 | A | 3/1999 | Garrot, Jr. et al. | 701/1 |
| 5,999,211 | A | 12/1999 | Hedges et al. | 348/144 |
| 6,384,860 | B1 | 5/2002 | Tullock et al. | 348/144 |
| 6,504,570 | B2 | 1/2003 | LeCompte | 348/144 |
| 7,271,826 | B2 | 9/2007 | Muirhead et al. | 348/144 |
| 7,437,062 | B2 | 10/2008 | Holcomb | 396/7 |
| 7,460,148 | B1 | 12/2008 | Clark et al. | 348/143 |
| 7,595,817 | B1 | 9/2009 | Zhang | 348/155 |

(Continued)

FOREIGN PATENT DOCUMENTS

WO    WO 01/05077 A1    1/2001

OTHER PUBLICATIONS

Authorized Officer Kim Ki Ho, Written Opinion of the International Searching Authority, PCT/US2010/052919, 3 pages, Jun. 23, 2011.

(Continued)

*Primary Examiner* — Jay Patel
*Assistant Examiner* — Geepy Pe
(74) *Attorney, Agent, or Firm* — Sunstein Kann Murphy & Timbers LLP

(57) ABSTRACT

A system to parse both telemetry data and corresponding encoded video data wherein the telemetry and video data are subsequently synchronized based upon temporal information, such as a time stamp. The telemetry data and the video data are originally unsynchronized and the data for each is acquired by a separate device. The acquiring devices may be located within or attached to an aerial vehicle. The system receives the telemetry data and the encoded video data and outputs a series of synchronized video images with telemetry data. Thus, telemetry information is associated with each video image. The telemetry data may be acquired at a different rate than the video data. As a result, telemetry data may be interpolated or extrapolated to correspond to each video image. The present system operates in real-time, thus data acquired from aerial vehicles can be displayed on a map.

19 Claims, 10 Drawing Sheets

U.S. PATENT DOCUMENTS

| | | | |
|---|---|---|---|
| 2003/0152145 A1 | 8/2003 | Kawakita | 375/240.12 |
| 2004/0183904 A1 | 9/2004 | Johnson | 348/144 |
| 2005/0257241 A1 | 11/2005 | Faulkner et al. | 725/92 |
| 2006/0203853 A1 | 9/2006 | Hwang | 370/503 |
| 2006/0274828 A1 | 12/2006 | Siemens et al. | 375/240.01 |
| 2007/0230742 A1 | 10/2007 | Burns et al. | 382/103 |
| 2007/0268367 A1 | 11/2007 | Agmon | 348/143 |
| 2008/0060034 A1 | 3/2008 | Egnal et al. | 725/105 |
| 2009/0012995 A1 | 1/2009 | Sartor et al. | 707/104.1 |
| 2009/0040305 A1 | 2/2009 | Krajec | 348/144 |
| 2009/0273671 A1 | 11/2009 | Gardner | 348/144 |
| 2010/0277588 A1* | 11/2010 | Ellsworth et al. | 348/144 |

OTHER PUBLICATIONS

Kumar, R., et al., "Aerial Video Surveillance and Exploitation," *Proceedings of the IEEE*, vol. 89, No. 10, Oct. 2001, pp. 1518-1539.

* cited by examiner

DATA SEARCH, PARSER, AND SYNCHRONIZATION OF VIDEO AND TELEMETRY DATA

PRIORITY

The present U.S. Utility Patent Application claims priority from U.S. Provisional Patent Application Ser. No. 61/252,959 filed on Oct. 19, 2009, which is incorporated herein by reference in its entirety.

TECHNICAL FIELD

The present invention relates to temporally locating data within a either a structured file or structured data stream and more particularly to locating a frame within an encoded video sequence associated with a temporal time for the frame. Additionally, the present invention relates to systems and methods for synchronizing telemetry data with corresponding encoded video data and methods for parsing data.

BACKGROUND ART

It is known in the prior art to have MPEG-encoded video, such as MPEG-2 encoded video. In order to provide some search mechanism, DVD video divides encoded video sequences into chapters. A user of a DVD system can move between chapters of a video program and can search by chapter, but the user cannot access a specific frame at a specific time within the program. Normally, in order to find a specific frame within an MPEG transport stream, the entire MPEG transport stream would need to be decoded and then a frame could be located that is associated with a specific playback time. Thus, the video would need to be completely rendered.

In the prior art, it is known to acquire telemetry data and to perform simultaneous aerial photography/videography. In order to be useful for map-based rendering, the telemetry data and the video images need to be synchronized. In common video acquisition systems, the MPEG video protocol and other video compression protocols are used. Because the frame data is compressed and not temporally indexed, exact time locations for each video frame can not be directly acquired as explained above. Thus, for useful real-time and substantially real-time systems, methods are needed for quickly locating video frames within a compressed video sequence associated with a specific media playback time, so that the video frames can be synchronized with acquired telemetry data for rendering the acquired video frame(s) on a map.

Data parsing is a well-known technical art. Parsing generally requires the creation of a parse tree where tokens i.e. predefined data words, are identified and placed into the parse tree. The parse tree can then be retraced to determine the syntax of the identified words. In real-time applications, where there is a large amount of streamed data that needs to be parsed and also synchronized, traditional parsing algorithms are not effective.

SUMMARY OF THE INVENTION

In a first embodiment of the invention there is provided a system that can parse both telemetry data and corresponding video data wherein the telemetry and video data are subsequently synchronized based upon temporal information, such as a time stamp. The telemetry data and the video data are originally unsynchronized and the data for each is acquired by a separate device. The acquiring devices may be located within or attached to an aerial vehicle. The system receives the telemetry data stream or file and the video data stream or file and outputs a series of synchronized video images with telemetry data. Thus, there is telemetry information associated with each video image. The telemetry data may be acquired at a different rate than the video data. As a result, telemetry data may be interpolated or extrapolated to create telemetry data that corresponds to each video image. The present system operates in real-time, so that data acquired from aerial vehicles can be displayed on a map. Such a system can be used in battlefield conditions for providing real-time visual information about troop movements. Additionally, the video and telemetry data that is streamed from the aerial vehicle may be captured and stored to memory as a file. The telemetry and video data can then be retrieved at a later time, parsed, and synchronized and the video data spatially transformed for rendering on a display device. The system can allow a user to select a temporal period for display. For example, an aerial vehicle may take images over several hundred miles during a flight and a user may only be interested in a selected region. Thus, a user can select a temporal period for which the aerial vehicle is expected to pass over the area of interest and that image information will be displayed on a map without displaying the other acquired information in the video file.

The telemetry data parser receives in KVL (key value length) formatted data from either the acquiring device or from a file stored in memory. The parser does not require bit by bit analysis and will skip invalid data without the need to retrace a hierarchical syntax tree. Rather bytes of information are analyzed to find known key sequences. The key values designate the type of data that follows the key. The parser locates the time stamp for the telemetry data and if the telemetry data is within a specified time period, the data is saved and stored to memory. Based upon the key values within the telemetry file or stream, the telemetry data acquired for a specific time period can be identified and stored into a known database structure. If the timestamp for the telemetry data is not in the desired time period, the data is discarded and the parser continues without adding the data to a parse tree. Thus, the parser is a serial rather than hierarchical parser. The parser validates the keys by comparing the keys to known key values and validates the telemetry data based upon a checksum. If the data is invalid, the parser will move to the next byte of information, discarding the invalid data, and will begin looking for the next key value. This is in contrast to prior art parsers that will perform bit by bit analysis and if invalid data is encountered need to retrace the hierarchical parse tree. As a result, the parser can operate in real-time while operating on streams or files that have tens of thousands or hundreds of thousands packets where each packet corresponds to a key length value combination. The telemetry data parser, may parse telemetry data or other data that has an associated format with a series of keys where real-time parsing is necessary. The telemetry data parser may be embodied as a computer program on a computer readable medium for operation on a computer, as an electronic device, such as an application specific integrated circuit (ASIC) or field programmable gate array (FPGA) or may comprise a combination of electronics and computer code.

The data search module for the video data that is compressed uses a filter to locate an approximate timestamp for the compressed data. The data search module may also be referred to as a video frame extraction module. If the compressed data is in the MPEG, H.264 or other formats that includes a Presentation Time Stamp (PTS), the filter locates the PTS header and extracts the timestamp that indicates the approximate beginning media time for playback. The filter will discard the compressed data for any PTS header that does not have a time stamp either proximate to or within the desired temporal period. When the filter locates a timestamp within or proximate to the desired temporal period, the compressed data is passed to a decoder that decodes the associated data. The frame or frames that are within the desired temporal period are located and stored using the time stamp for each frame or calculating the time associated with the frame based upon the playback rate along with the PTS time. The methodology employed by the data search module may be used with other encoded video data systems and is not limited to the presently described embodiment for use with video captured by aerial vehicles. Additionally, the data search module may be embodied as computer code on a computer readable medium for use with a computer processor or may be embodied as an electronic device, such as an application specific integrated circuit (ASIC) or field programmable gate array (FPGA). Additionally, the data search module may be configured as a combination of hardware and software.

The system synchronizes the telemetry data and the video data that resides within the desired time period. Telemetry data may be extrapolated or interpolated in order to provide telemetry data for each image from the video stream. The telemetry data and synchronized video data within the desired time period are passed to a rendering engine. The rendering engine will use the telemetry data to output the video frame data to a display. The rendering engine will also perform the necessary spatial transformations on each video image given the view plane. In some embodiments, the video frame data may be transformed so as to be formatted for display on a map.

The system, method, and corresponding computer program products may operate in real-time on multiple data streams to render a plurality of video streams in real-time. As such, video from multiple aerial vehicles may be rendered on a map simultaneously.

In certain embodiments system for synchronizing unsynchronized encoded aerial video data and separately acquired telemetry data for generation of a map containing the aerial video data is disclosed. The system includes a telemetry parser for receiving a user-defined acquisition time period and a telemetry data stream where the telemetry data stream includes telemetry data acquired at a sampling rate that has an associated acquisition time and parsing the telemetry data stream to locate telemetry data temporally proximate or within the user-defined acquisition time period. In addition, the system includes a video frame extraction module for accessing an encoded aerial video data stream and decoding a portion of the encoded aerial video data stream into video frames having an associated video frame data time wherein the video frames are temporally proximate to or within the user-defined time period. Once the telemetry parser and the video frame extraction module identifies appropriate time stamps (e.g. the acquisition time and video frame data time) for the corresponding video and telemetry data, a synchronization module synchronizes the telemetry data and the video frame data for the desired acquisition time period based upon the acquisition time and video frame data time. The system may also include a filter for producing additional telemetry data so that there is telemetry data that corresponds to each video frame within the desired acquisition time period.

In various embodiments of the invention, the system may further include a graphical user interface outputting a desired acquisition time period of video data for display.

In embodiments of the invention, the encoded aerial video data stream is parsed to locate data based upon a presentation timestamp for a group of video frames temporally proximate to or within the desired time period. The telemetry data may be sampled at a rate that is longer than a sample rate for the video frame data.

The system may further include or be attached to a rendering module for producing a map wherein the video frame data is spatially transformed from an aerial acquisition plane to a map plane and the transformed video frame data is inserted into the map based upon the telemetry data associated with the video frame data. The system can also include memory for storing the telemetry data stream into a telemetry file and for storing the encoded aerial video data stream into an aerial video file. The graphical user interface may allow a user to select two or more video data files to be displayed on a map presented on a display device simultaneously.

The telemetry data may be stored in Key Length Value format. When the telemetry data is stored in Key Length Value format, the telemetry parser may parse a first known key byte size of data and places a first and second portion of the data into at least a first and a second buffer. The telemetry parser checks telemetry data within the first buffer for a first partial key value and if the telemetry data represents a valid partial key, the parser checks the telemetry data in the second buffer for a second partial key value.

The video frame extraction module may be configured so that the module will discard any MPEG-encoded data associated with a presentation time stamp that is not within a desired time range.

The telemetry parser may operate in the following manner. The telemetry parser receives a first section of the telemetry data file where the telemetry data file may include telemetry data stored in Key Length Value format. The telemetry parser compares the first section of the telemetry data file to an identified key. If the first section of the telemetry data file matches the identified key, the telemetry parser identifies the length associated with the desired key. The telemetry parser then compares an identified time stamp within the telemetry data to a desired temporal period. If the time stamp is temporally proximate or within the temporal period, the telemetry parser saves data of a length equal to the identified length to a database structure based upon the identified key. If the time stamp is not temporally proximate to or within the temporal period, the telemetry parser discards the telemetry data associated with the key and incrementing to a next byte of data from the telemetry data file. The telemetry data may include many different data types including indicia indicative of a ground location including the longitude and latitude position for the ground location that the camera attached to the aerial vehicle is photographing.

The video frame extraction module parses encoded video data to locate one or more video frames that have a desired time period. The video frame extraction module receives encoded video data and locates an approximate time stamp for a group of video frames. The video frame extraction module compares the approximate time stamp to the desired time period. If the approximate time stamp is proximate to or within the desired time period, the video frame extraction module decodes the group of video frames and identifies a frame time stamp for each decoded video frame. If the frame time stamp is within the desired time period, the video frame extraction module stores the associated frame and corresponding frame time stamp to memory for later retrieval. In certain embodiments, the encoded video data is encoded in an MPEG format. The approximate time stamp may be a presentation time stamp which is an estimate of playback time and is associated with an identifiable time range.

Once the video frame extraction module and telemetry parser have parsed the video data and telemetry data and have located the data for the user-defined time period. The synchronization module synchronizes the telemetry data with the decoded video frames for the user-defined time period. The synchronized telemetry data and corresponding decoded video frames are stored to memory. The telemetry data may be stored in a file structure, for example, a file structure used by a relational database system. The decoded video frames then undergo a view space transformation based on the corresponding telemetry data so that the video data can be displayed on a display device. Once the video data is view spaced transformed, the encoded video frames are rendered on a display. The video frames may be overlaid on a map and may be presented in real-time (i.e. sequentially) on the display device.

The desired time range (i.e. the user-defined time period) may be determined based upon the selection of a location on a map. In such embodiments, then desired time period is determined by a graphical user interface and the graphical user interface passes the desired time range to both the telemetry parser and the video frame extraction module through the control module.

The graphical user interface receives as input a map location and identifies the desired time period by accessing a database of encoded video data files and associated flight times. Based upon the associated flight times, the graphical user interface selects an encoded video data file based on a flight path for an aerial vehicle that acquired the encoded video data file. The graphical user interface can then estimate the approximate desired time period based upon the flight path, start time for the flight and speed of the aerial vehicle.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

The term "module" as used herein shall refer to software components (e.g. objects, program blocks, separate independent programs etc.), hardware components (circuitry such as ASICs or FGPAs), or software and hardware component combinations. The modules may reside at a single location or may be distributed at different locations.

Aerial reconnaissance vehicles including airplanes, helicopters, and drones may be equipped with video recording equipment for recording images of the surface of the earth including the terrain, buildings, people, and vehicles. Additionally, aerial reconnaissance vehicles may include a telemetry acquisition device for recording telemetry information at a series of predetermined times. The telemetry data may include such information as the location of the aerial reconnaissance vehicle with relation to the ground. Some aerial reconnaissance vehicles are equipped with off-the-shelf telemetry acquisition devices and off-the-shelf video recording equipment. In such vehicles, the telemetry acquisition device and the recording equipment operate independently and are not synchronized. Both the telemetry acquisition equipment and video recording equipment produce output data streams wherein the data is produced at sampling/acquisition rate.

Figure 1:
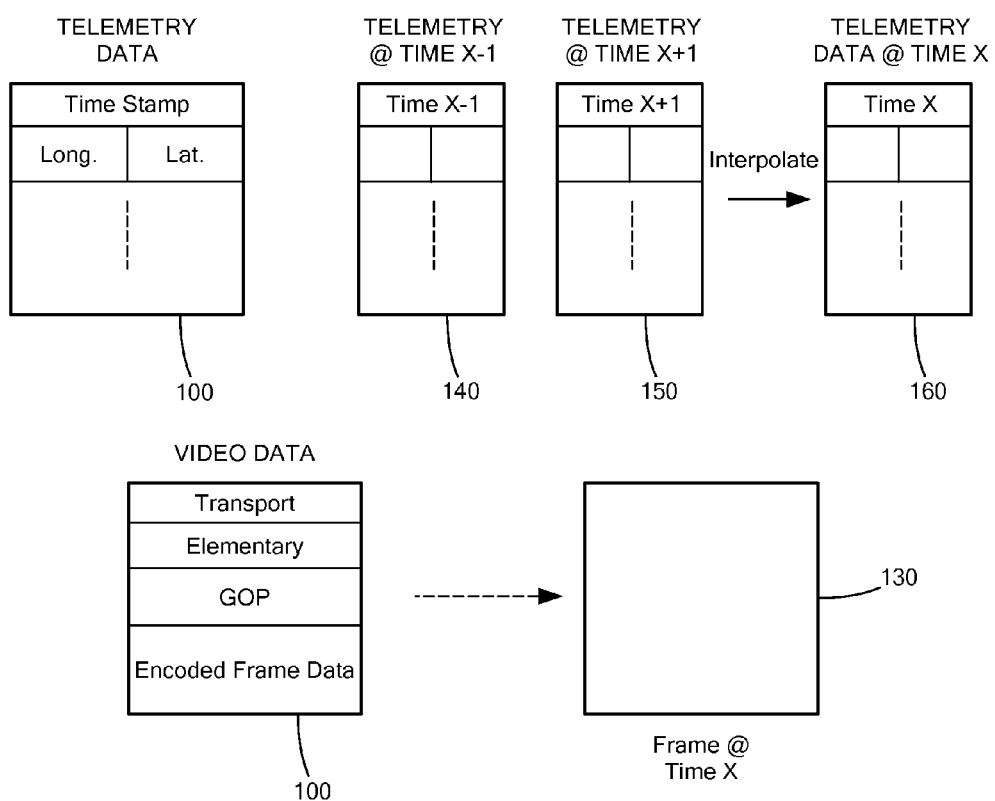
FIG. 1 shows the acquisition of separate telemetry and compressed video data wherein the data is processed to locate a video frame at time X and to locate telemetry data at time X.

The video recording equipment may record the video data in a compressed format, such as MPEG-2 encoded data. The video data is transmitted from the aerial vehicle to a central receiving office for further processing. Similarly, the telemetry data may also be transmitted from the aerial vehicle to the central receiving office for further processing. This may be done in real-time. In some embodiments, the video data and the telemetry data may be encoded together in a single MPEG-2 transport stream for transmission to the central receiving location from the aerial vehicle. For example, an aircraft or other airborne vehicle may take video of the surface of the earth and record those images in an MPEG format while telemetry information corresponding to the video is acquired. A processor may receive the telemetry data stream and the video data stream and format the telemetry data stream as an MPEG elementary stream. The MPEG video elementary stream along with the telemetry elementary stream can then be wirelessly transmitted as a single MPEG transport stream to the central receiving office. The telemetry data and the MPEG video are demultiplexed when received at the central receiving location for processing and display on a display device. In such systems, the video and the telemetry acquisition systems are not synchronized and information from the video and telemetry acquisition systems is acquired independently. In addition, the video and telemetry systems may acquire data at different rates (e.g. telemetry data at every 0.5 sec. and video images at ⅟30 sec.). This may be the case even when the video and telemetry data are contained within the same MPEG transport stream. Thus, as shown in FIG. 1 there are two separate data files: a telemetry data file 100 and a video data file 110.

Because of the speed of aircraft, each image/frame may represent an aerial view of a different ground location (i.e. longitude and latitude location). In some instances, each image may be a picture of 50 yards or more of land (depending on speed of the aircraft, altitude, camera lens, field of view etc.). Each frame of video data can be associated with different telemetry data and depending on the sampling rates, multiple video frames may occur between telemetry samples. Thus, the telemetry data and the video data need to be synchronized using timing information acquired during the acquisition of the data. The telemetry data may be time stamped relative to an internal clock of the telemetry system or associated with an external clock. Similarly, the compressed MPEG video data contains time stamps for each video frame, however these time stamps are not accessible unless the MPEG video data is decompressed. As shown in FIG. 1 the video data 110 is received as compressed MPEG data (transport stream) and the end result is synchronization between a decoded MPEG frame 130 at a specified media playback time X with corresponding telemetry data 160 for time X. As shown, the telemetry data needs to be interpolated because the frame acquisition rate is quicker than the telemetry acquisition rate (interpolation between telemetry data 140 and 150).

Figure 1A:
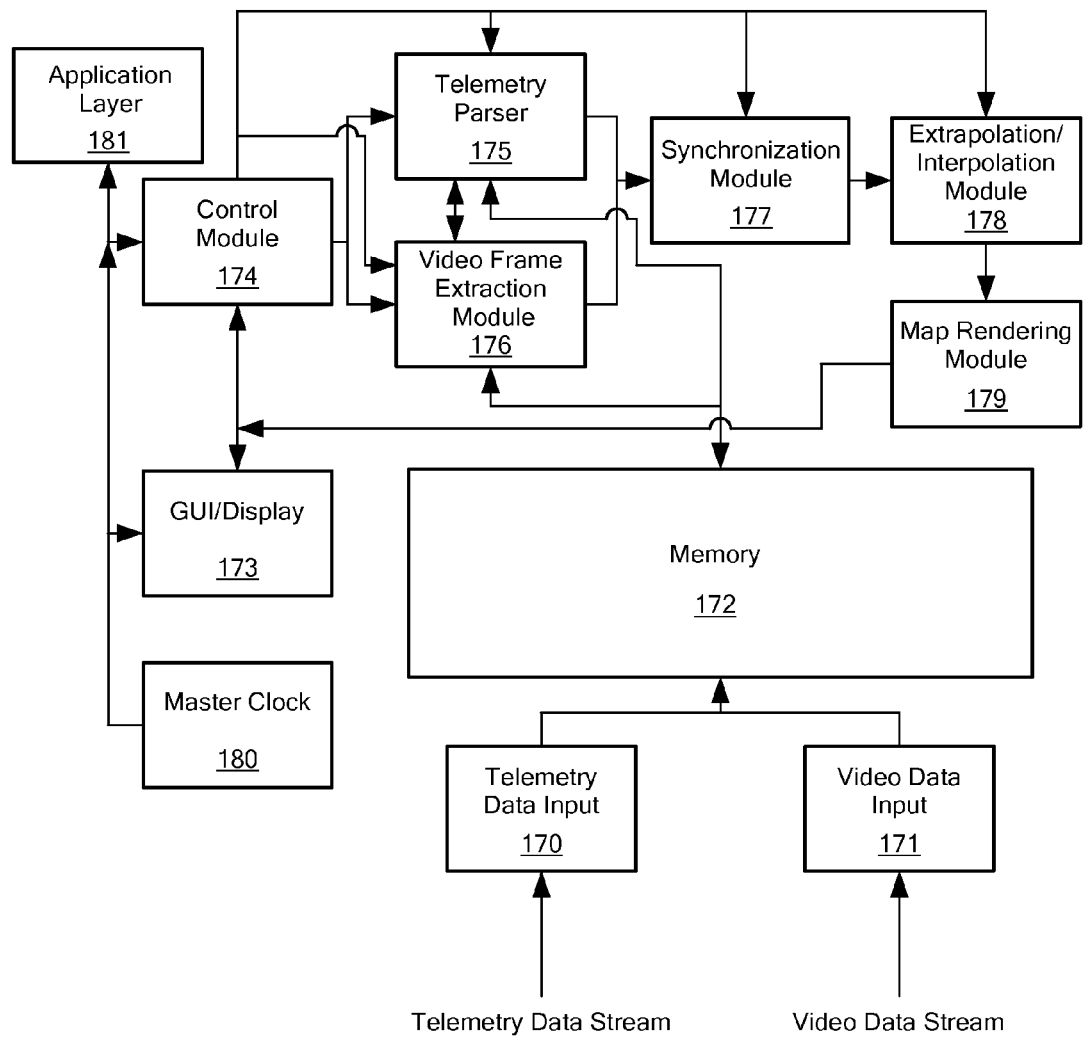
FIG. 1A shows an embodiment of the system including communication paths between the internal modules.

FIG. 1A shows an exemplary system for the creation of a graphical map for display on a display device wherein the graphical map includes overlaid video images. Telemetry data and video data are input to the system through a telemetry data input 170 and a video data input 171. Originally, the telemetry data and video data may be streamed to the system in an MPEG transport stream wherein the telemetry data would be part of a first elementary stream and the video data would be part of a second elementary stream. In such an embodiment, the data would be demultiplexed and the individual streams would be directed through their respective inputs to memory 172. The memory 172 may be a buffer for buffering the telemetry data stream and video data stream if real-time display is selected or the memory may store the telemetry data and video data for later retrieval and display.

A user interacts with a graphical user interface 173. The user can indicate using the graphical user interface 173 to receive saved or real-time information retrieved from a manned or unmanned aerial vehicle displayed on a display device 173 where a graphical map is generated and individual frames of video are placed on the map at the appropriate longitude and latitude coordinates. In a real-time embodiment, the graphical user interface 173 communicates with a control module 174.

The control module 174 oversees the creation of the map with the aerial video frame data along with the synchronization of the telemetry and aerial video frame data. The control module 174 instructs the telemetry parser 175 and video frame extraction module 176 to retrieve from memory 172 the telemetry data and the video data respectively. The control module 174 also provides timing signals to each of the modules (telemetry parser 175, video frame extraction module 176, synchronization module 177, and extrapolation/interpolation module 178) so that the data can be moved between the modules and eventually rendered on a display. At a layer above the control module is the application layer 181. Application layer 181 interfaces with the graphical user interface 173 and determines the number of instances of the control module that are necessary. Multiple video control modules would be necessary if multiple videos are to be displayed and synchronized together. For example, if a user indicates that through the graphical user interface that he wishes to view video from a plurality of aerial vehicles each displayed on a common map. In certain embodiments a master clock 180 is used for synchronization. The master clock can be used for synchronizing the telemetry and video data to a common clock and additionally can be used to synchronize multiple video streams that are being controlled by the control module for simultaneous display.

The telemetry parser 175 parses the telemetry data stream that is retrieved from memory. The data is parsed locating the telemetry information that was sampled at a specified time. The telemetry data along with the specified time is passed to the synchronization module 177 and buffered. The telemetry parser 175 passes the specified time to the video frame extraction module 176.

The video frame extraction module 176 retrieves the MPEG or H.264 video stream from memory parsing the stream to locate each Presentation Times Stamp (PTS) header. The time stamp associated with the PTS is identified and compared to specified time from the telemetry parser. If the time stamp of the PTS is within a preset temporal range of the specified time (e.g. the PTS time stamp occurs before the specified time), the PTS is decoded. If the PTS is not within the preset time range, the PTS header information and the encoded data are discarded. For PTS that are within the preset time range, the video frame extraction module 176 decodes the PTS so that the PTS can be rendered on a display device 173. During the decoding process the video frame extraction module 176 identifies the time stamp associated with each frame. The video frame extraction module 176 passes the decoded video frames along with their time stamp to the video renderer.

The synchronization module 177 may buffer multiple sets of telemetry data sampled at different times. The synchronization module 177 then queues the telemetry data until its time stamp corresponds to the video stream time within a specified tolerance. The video stream time is the video display or render time. Therefore, the next displayed video frame would be associated with telemetry data that is being released from the queue. It should be recognized that the telemetry data may be acquired at a different rate than the video data. Typically, the telemetry data will be sampled at a rate that is less than that of the video data. As a result, each set of telemetry data could be associated with one or more frames of video data. Once the telemetry data time stamp is within the stream time tolerance, the data is passed to an extrapolation/interpolation module 178.

The extrapolation/interpolation module will interpolate telemetry data between two sets of telemetry data so that for each video frame there is an associated set of telemetry data or will extrapolate telemetry data from one or more previously received telemetry data samples. In other words, for each sampling period for a video frame, there is corresponding telemetry data that is associated with that sampling period (e.g. for time period X video frame 1 is captured and there is corresponding telemetry data A).

The interpolation/extrapolation module 178 then passes the telemetry data to a map rendering module 179 to associate with the current video frame. The map rendering module 179 transforms the video frame image data so that the data may be displayed on a map on a display device 173. Thus, the data is warped from the acquisition plane to the viewing plane. The associated telemetry data for the video frame data indicates that longitude and latitude of the video frame allowing for the images to be rendered on the map.

In other embodiments, the system may work with pre-recorded data that is stored in files in memory 172. In such embodiments, a user may interact with the graphical user interface 173 to select either a video file associated with a specific date and time or the user may select a location on the map for display of any corresponding video. The user may also select a subset of a specific file by designating the start time or a temporal period (start time and end time) for playback. When the user indicates either directly or indirectly a start time and or a start/stop time, the video frame extraction module 176 will parse the Presentation Time Stamp header and determine based upon the start time stamp whether the data should be decoded. If the PTS time stamp is outside of the time range, the video will be discarded and not decoded. Similarly, the telemetry parser 175 will parse the telemetry data from a stored file, but will only save and store relevant telemetry data (telemetry data with a time stamp within the start/stop time period) to memory for passing to the synchronization module 177. It should be recognized by one of ordinary skill in the art that the various, modules and parsers (174-179) along with the graphical user interface may operate on one or more processors. The modules and parsers may also be formed on one or more integrated circuit chips. For example the synchronization module and the extrapolation/interpolation module may reside on the same piece of silicon.

Figure 2:
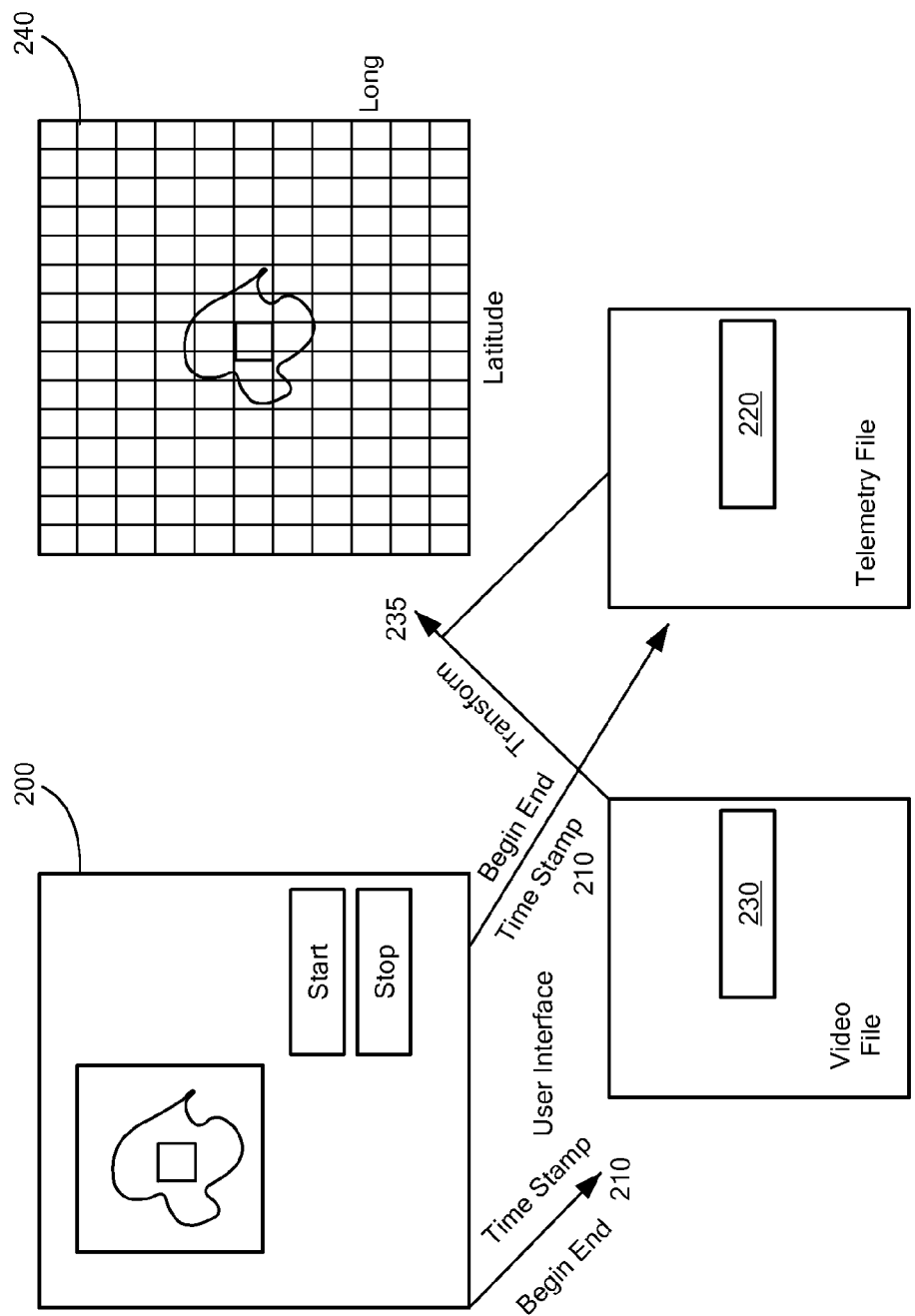
FIG. 2 shows a system that includes a processor with an associated graphical user interface for viewing real-time aerial video data and having the video data transformed based upon acquired telemetry data for display on a map on a video display.

In a real-time acquisition and display system, wherein the video is displayed to the user upon being received from an aerial vehicle, the user may indicate through a user interface 200, the video data that the user wishes to have placed on a map as shown in FIG. 2. Thus, via the graphical user interface the system determines a beginning and ending time stamp 210, which can be used for selecting the appropriate telemetry data 220 and also locating the corresponding video data 230. The beginning and ending time stamp (i.e. user-selected time period) can be determined based upon an expected location for the aerial vehicle given the aerial vehicle's flight path. For example, if an aerial vehicle is flying and transmitting in real-time encoded video and telemetry data, the user of the system may only be interested in viewing a portion of the video that is captured by the aerial vehicle. Thus, based on the flight path, an estimate of the time that the aerial vehicle will capture images of the desired ground location can be calculated using techniques know to those of ordinary skill in the art. This user-selected time period can then be used by the system for parsing the telemetry data stream and the video data stream to locate the telemetry data and video data that corresponds to the user-selected time period. If pre-recorded telemetry and video data files are used a similar technique can be employed. A database that contains a listing of the possible pre-recorded aerial and telemetry data files may be accessed by a user through the graphical user interface. The database may include information concerning the flight path for the aerial vehicle and may even include a listing of locations of interest that were filmed by the aerial vehicle. From this list, a user can select the desired file to be displayed and can indicate either graphically on a map or through coordinates or through entry of a location (city, street, address) the video data that the user wishes to view. The system can then translate the selected known location into a user-defined time period. In this real-time system, the telemetry and video data are stored to a file or to memory. Once the telemetry and video data files are parsed based upon the time stamp(s) the video information is transformed in a view space transformation engine 235 based upon the telemetry data. The transformed video frames are then rendered and displayed on a map 240.

Figure 3:
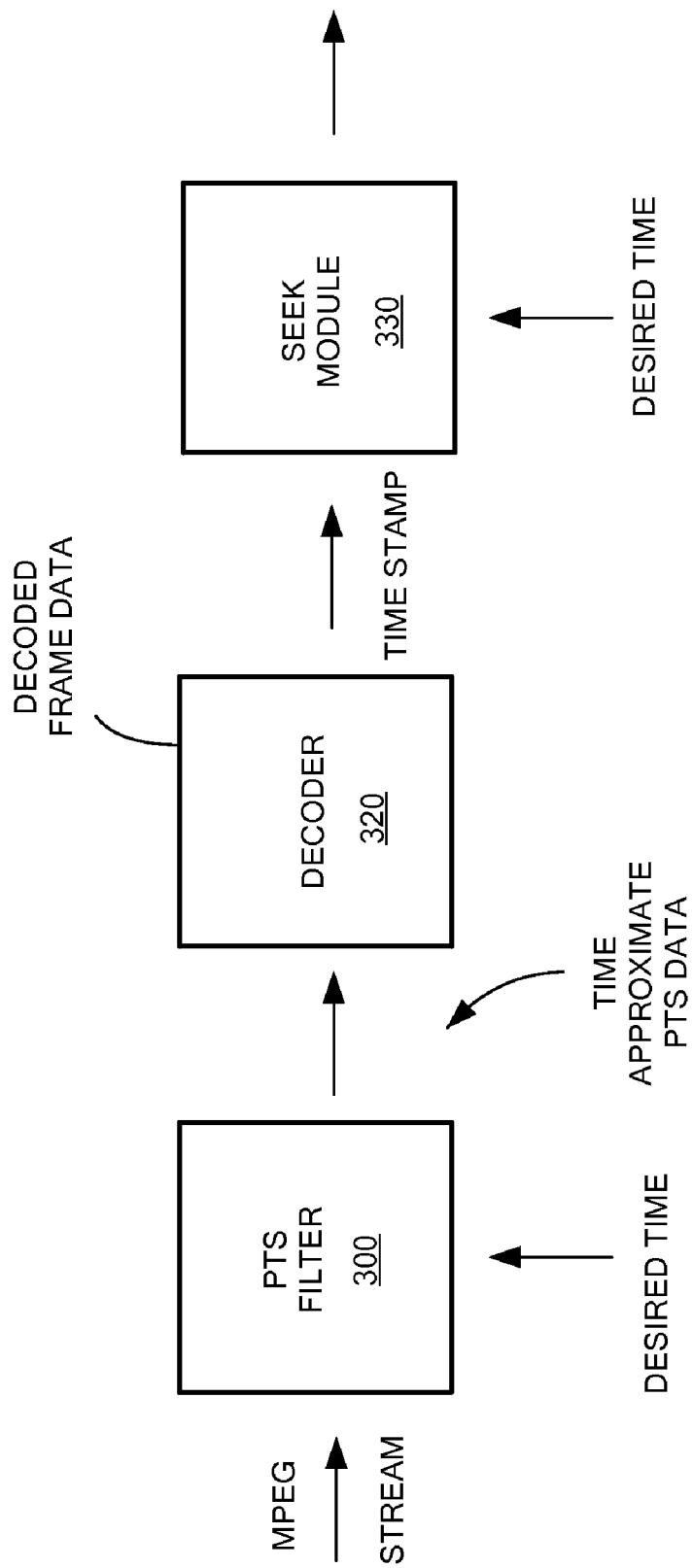
FIG. 3 is a portion of a data pipeline processor for locating a video frame or frames associated with a desired time or period that is stored in a compressed video file.
Figure 4:
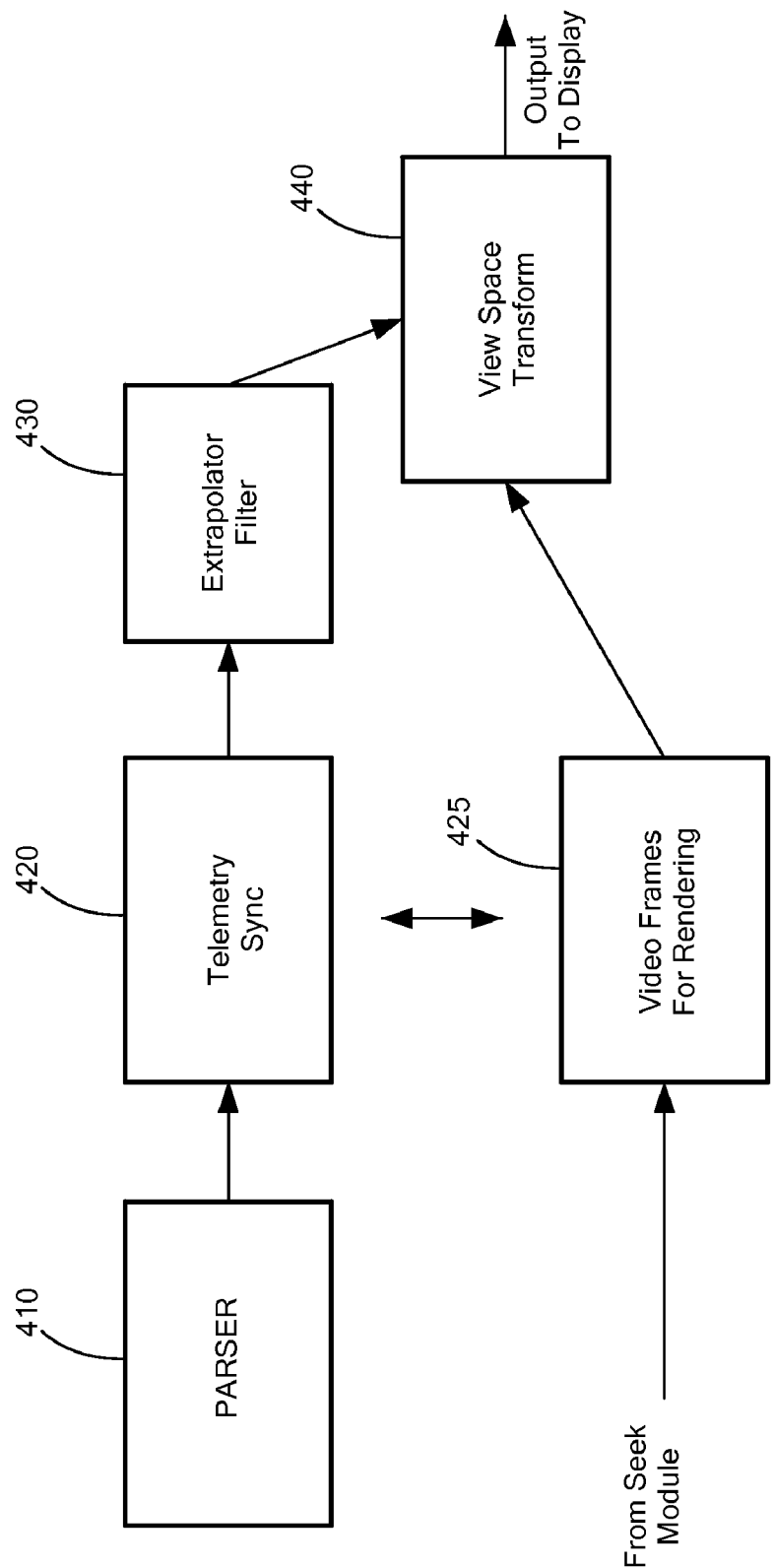
FIG. 4 is a second portion of the data pipeline processor that shows the telemetry data parser, telemetry synchronization module and extrapolation filter wherein the video frames from the desired time period are synchronized with the corresponding telemetry data prior to being passed to the rendering engine that includes the view space transform.

The telemetry data and the video data can be extracted serially or the data can be extracted in parallel in a pipe-line processor (See FIGS. 3 and 4 for a schematic of the pipeline processor). The processing of the telemetry and video data may begin with the receipt of an MPEG transport stream or other stream wherein the telemetry data and the video data are stored in one or more elementary streams and the telemetry and video data are demultiplexed using known demultiplexing techniques and/or demultiplexors. In other embodiments, the telemetry data and the video data may be streamed in separate streams. In other embodiments, the video data and telemetry data may be previously acquired and stored in separate files.

It should be recognized by those of ordinary skill in the art that the term "acquisition time" corresponds to a spatial location on the ground. Thus, by locating a specified acquisition time within the video sequence, the system locates video for a specific location (longitude and latitude).

In order to acquire the video frame or frames associated with a desired time or period, a method is required for extracting temporal information with an accuracy of approximately the display period of a frame from the compressed video file. In some embodiments, the video frames are encoded using protocols such as MPEG-2, MPEG-4, H.264 which do not include a temporal frame index, therefore this information must be indirectly determined if real-time or substantially real-time performance is desired.

Each of the identified protocols has a hierarchical structure with headers at each level including headers for: the file (e.g. transport stream), the stream (e.g. elementary stream), group of pictures, individual pictures (e.g. frame), and portions of a picture (e.g. macroblocks) that provides information about that level. In the MPEG protocols, the Presentation Time Stamp is metadata based on a system clock indicating the time the data should be presented. The system uses a MPEG-2 Transport Stream Source filter which encapsulates the PTS filtering 310. The MPEG-2 Transport Stream Source filter parses the transport stream to locate the first PTS header and extract the time for that PTS. The MPEG-2 Transport Stream Source filter will continue to parse the video file until the PTS filtering finds a starting time that is proximate to the desired starting time selected by a user of the system. A more specific embodiment of the methodology employed within the PTS filter is provided in the flow chart of FIG. 3A.

Figure 3A:
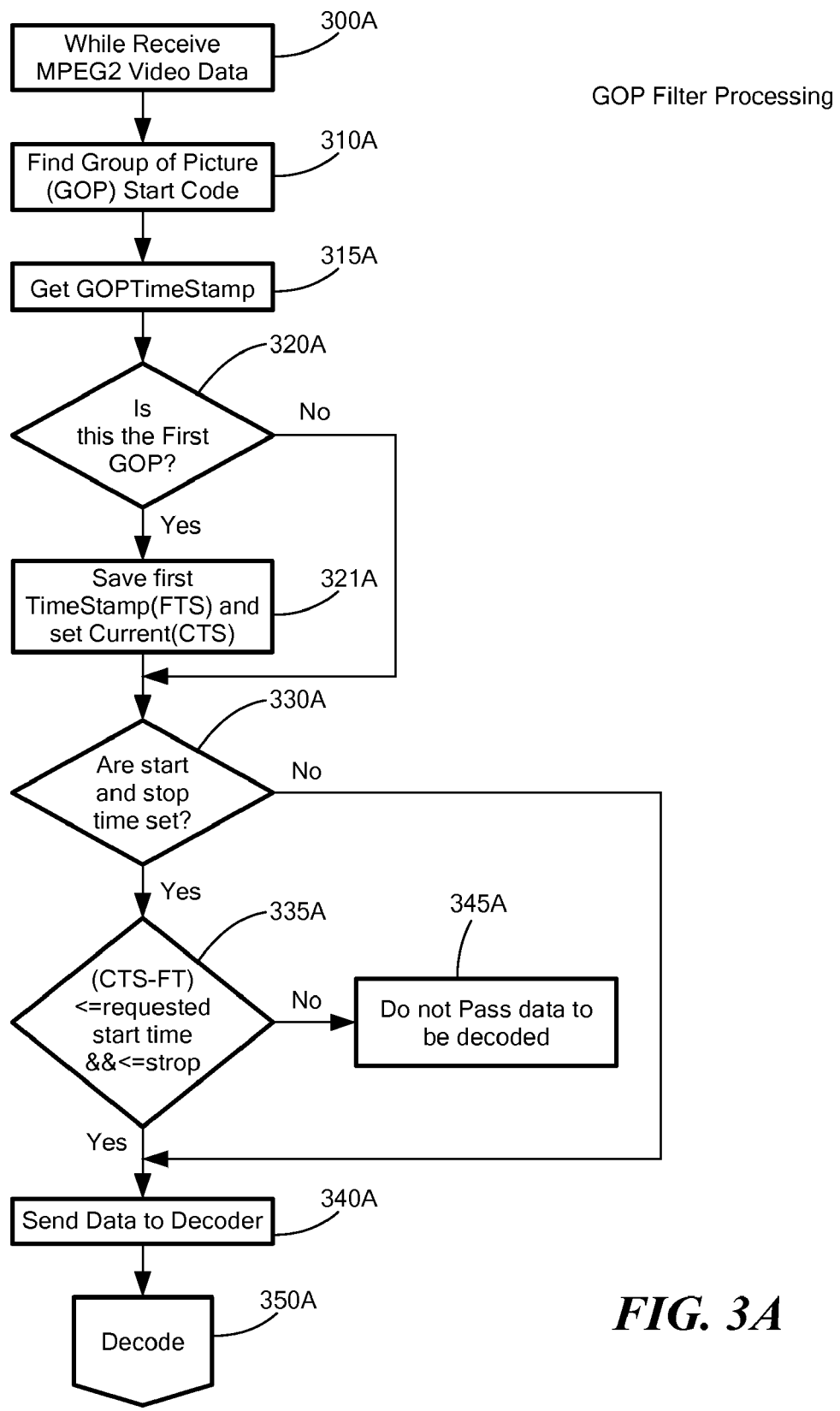
FIG. 3A is a flow chart of the steps performed by the group of pictures filter.

In FIG. 3A the video data is received into the PTS filter. In FIG. 3A the video data is streamed into the PTS filter as an MPEG elementary stream 300A. The MPEG-2 Transport Stream Source filter parses the MPEG stream to identify the Presentation Time Stamp The MPEG-2 Transport Stream Source filter identifies the packets containing PTS. 310A. The PTS filter 300 then gets the PTS timestamp which is the approximate start time for presentation. If this is the first PTS 320A, then the timestamp is saved as the both the first timestamp and the current timestamp 321A. The PTS filter 300 then checks to see if the start and stop times are set 330A. The start and stop times are the requested times for which a user wishes to view the video data. The PTS filter then performs the following equation ((Current time stamp−First time stamp)>=requested start time &&<=stop time) 335A and if the video data falls within this time period, the video data for the group of pictures is passed to a decoder 340A. If the information is not within the defined time period, the video data associated with that group of pictures is not passed to the decoder 345A. The data that has been passed to the decoder is then decoded to the spatial domain 350A. The process can operate on each PTS within each MPEG elementary stream or the process may terminate when the appropriate PTS is located.

Returning to FIG. 3 once the appropriate PTS is located that contains the desired frame or frames, the MPEG encoded data for that PTS can be decoded in an MPEG decoder 320. The other header information from the MPEG transport stream/file and MPEG data can be discarded and thus, only the MPEG data that contains the desired frames are decoded. It should be recognized that the user or system may indicate a start and stop time for display and thus more than one group of pictures may be decoded since the start and stop time may reside within multiple groups of pictures.

Once the desired frames are decoded, the exact frame that corresponds to the desired temporal location can be located in the seek module 330. The frame associated with the specific temporal location can be determined based upon the media sample timestamp for each frame. By using the PTS information, the entire encoded video sequence does not need to be decoded in order to locate the frame(s) having a media sample timestamp that corresponds to the time associated with the desired location (latitude and longitude). A more specific embodiment of the methodology employed by the seek module is provided in the flow chart of FIG. 3B.

Figure 3B:
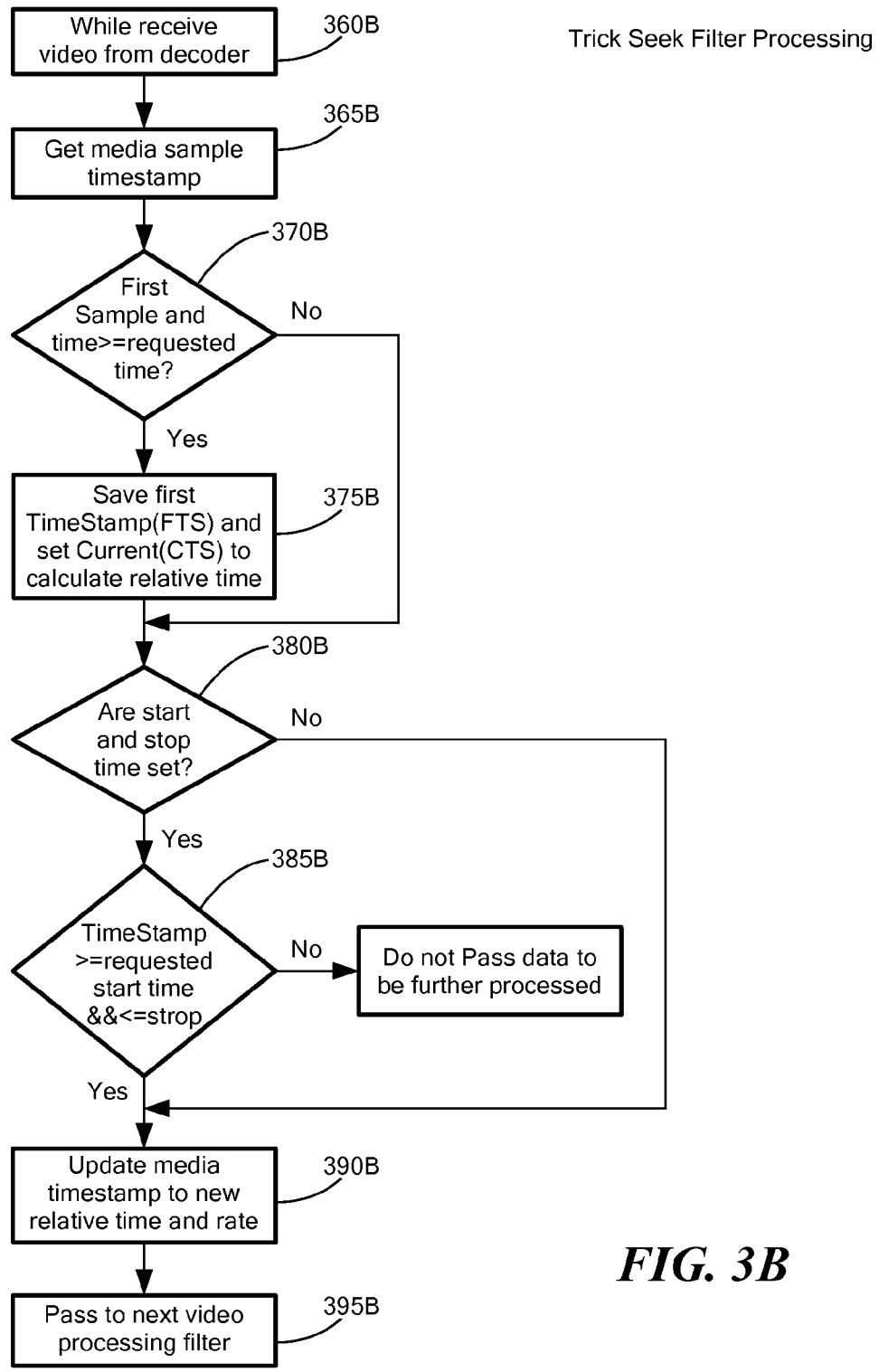
FIG. 3B is a flow chart of the steps performed by the seek module for finding a particular video frame within the compressed video file.

FIG. 3B is a flow chart of the methodology that may be employed by the seek module. The seek module first receives decoded video frames from the decoder 360B. The seek module identifies the media sample time stamp from the decoded video frame 365B. The seek module then checks to see if the media sample time stamp for the first image is greater than or equal to the requested start time 370B. This is performed because the PTS does not provide the exact media frame time. Thus, there may be additional data that that needs to be accounted for when identifying the exact time and desired frame for display. For example, the PTS may indicate that the first frame is to be played back at 1:04; however, the first frame may actually be at 1:03.90. Thus, the first time stamp and current time stamp need to be set to 1:03.90. 375B. The seek module checks to see if the requested start and stop times have been provided. 380B. The requested start and stop times correspond to the video that a user wishes to view. The seek module compares the time stamp to the requested start and stop times, to see if the timestamp of the frame falls within the requested time period. 385B If it does, the video data is time stamped with the relative time stamp. 390E Thus, the relative time stamp will cause the system to immediately begin playback of the video frames that are within the requested time frame. 395B.

In the above example, it was assumed that the user inputted a requested start and stop time and from this information the specific frames were located. Other user defined input may be used in the described system. For example, in some embodiments in which the telemetry data has been stored in a database, the user may define a specific longitude and latitude that the user wishes to view. From the database, the longitude and latitude can be located and the associated data file containing the acquisition time can be found. Once the acquisition time is determined, the above described methodology may be employed wherein a fast search may be performed on the MPEG encoded data without the need for decoding each frame. Further, it should be understood that this fast seek methodology may be used in other industries for quickly locating a specific video frame within a compressed video stream that occurs at a specific time. For example, this technique may be applied to video forensics, video surveillance systems and video editing.

FIG. 4 shows the later half of the modules from FIG. 1A including the telemetry parser (parser), synchronization module (telemetry sync), the extrapolation filter (extrapolation/interpolation module) and the map rendering module (view space transform). This figure exemplifies the synchronization between the telemetry data and the video frame data. The video frame data is decoded and stored in a buffer along with timing information (time stamp) for each frame.

The telemetry data is passed to parser 410. The telemetry data may be encoded in key length value (KLV) format. The parser operates on data packets and compares the first two 64 bit words to known key values. When a key is identified, the parser continues to parse the data until the parser determines the end of the telemetry data for an acquisition time. Once the end of the telemetry data is determined the time stamp is located for the telemetry data. If the identified time stamp is within or proximate to the desired time stamps (beginning and ending time), the telemetry data is stored to memory, otherwise the telemetry data is skipped/discarded. Once a packet has been built (i.e. all of the telemetry data associated with an acquisition time) and the packet is within the desired time period, the packet containing the telemetry data is passed to a telemetry synchronization module 420. The telemetry synchronization module 420 requests the telemetry data until its timestamp is approximately the same as the current video presentation time. The telemetry synchronization module queries the video media time and releases the telemetry data when the time stamps of both the telemetry data and the video data 425 are approximately the same. In certain embodiments, the time stamp from the video data 425 may represent the presentation time as opposed to the acquisition time. As a result, the system will compensate for the difference between the acquisition time and the presentation time so that the telemetry data time stamp represents the presentation time. The telemetry synchronization module compares the time stamp to the current stream time for presentation of the video data to determine when the telemetry data should be released for further processing. Thus, the data is not only synchronized, but also properly timed for presentation. In some embodiments, the telemetry synchronization module will store a plurality of telemetry data packets (i.e. telemetry data acquired at different times). The telemetry synchronization module provides a buffer for storing the relevant telemetry data in a structured format. The buffer holds telemetry data that may have an associated acquisition time that is before or after the desired start and stop times for the video data, since the telemetry data may be sampled/acquired at a different rate than the video data.

The telemetry data is then passed to an extrapolation filter 430. The extrapolation filter will either extrapolate or interpolate the telemetry data if the time stamp of the telemetry data does not match the desired time stamp. In one embodiment, since the telemetry data is sampled at a slower sampling rate than the video data, telemetry data before the desired time and telemetry data acquired after the desired time are used to interpolate the telemetry data for the desired time. Thus, the extrapolation filter produces a one-to-one correspondence between each desired video frame and the telemetry data. In the preferred embodiment, the telemetry data once parsed from the initial file is packetized, such that all information associated with a particular location is kept together.

Once the telemetry data is determined by the extrapolation filter, for the desired time, the telemetry data is passed to the view space transformation module 440. The view space transformation module performs a projection of the video data 425 onto a map based upon the telemetry data (e.g. aircraft altitude, longitude, latitude, field of view, focal length etc.). The resulting transformed video frame data is presented on a map and the data is displayed to a display device. Various known techniques for performing space transformations and rendering of digital data for display may be used.

Detailed discussion regarding the parser, telemetry synchronization module and the extrapolation filter are now provided.

Figure 5:
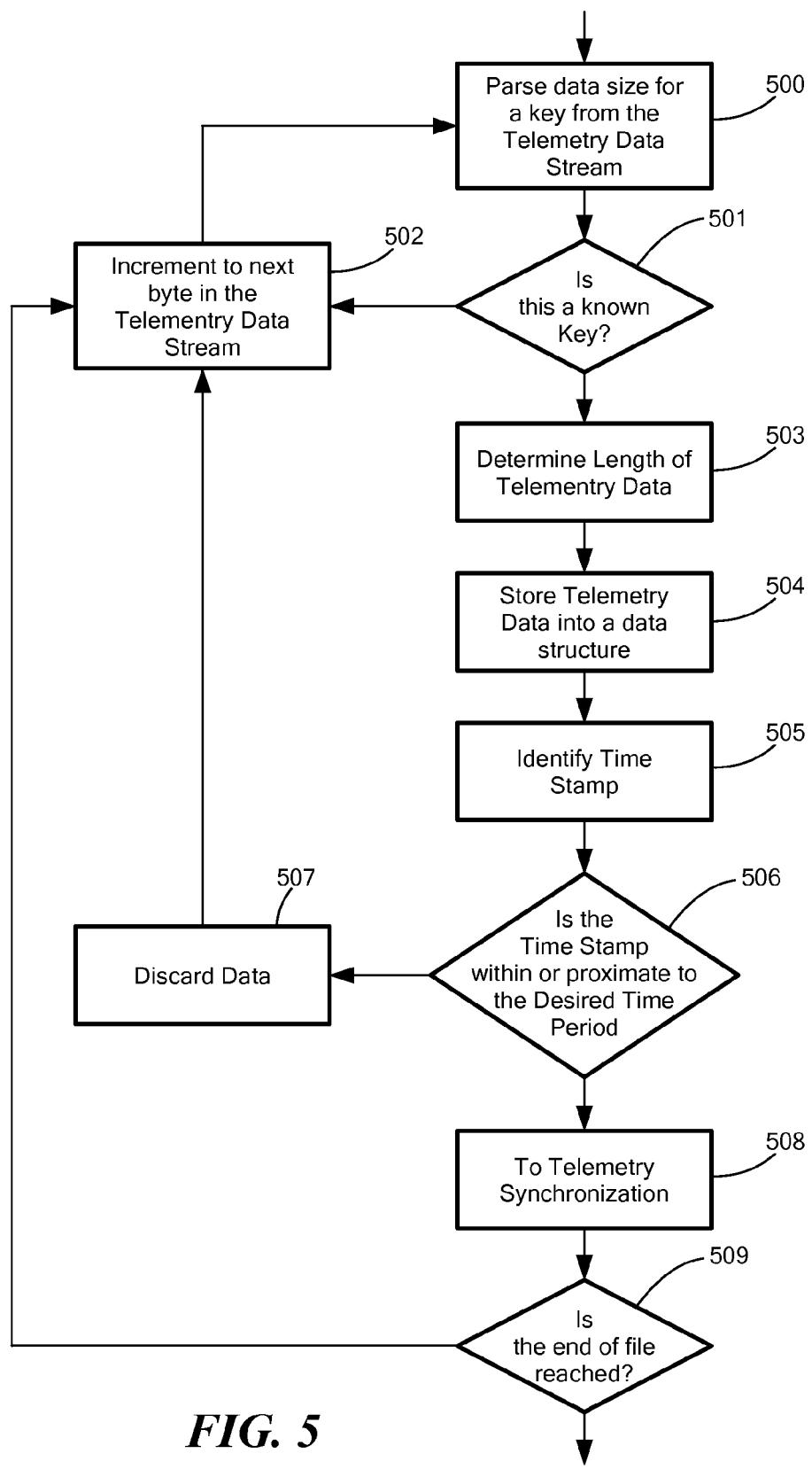
FIG. 5 is a generalized flow chart for the telemetry parser.

In order to co-ordinate the video and telemetry data, the streamed or stored telemetry data file must be parsed as shown in the flow chart of FIG. 5. The flow chart of FIG. 5 shows a reduced complexity flow chart for parsing the telemetry data. FIG. 5 does not include the added complexity of nested keys, and only shows the process for a high level keys, however the text below explains nested keys. The telemetry data file may be large in size and a file may include many megabytes of data. The telemetry data file may be stored in a format such as that defined by the Motion Imagery Sensory Board (MISB) standard 0601.3, 0104.5 or other similar formats. For each telemetry position acquired, the telemetry data may include such information as the longitude and latitude as well as the altitude of the plane when the data was acquired. Further there may be a time stamp. In addition, the telemetry data may include the Euler angles (roll, pitch and yaw) of the plane as well as the Euler angles of the camera (the difference due to the mount between the camera and aircraft). The telemetry data may further include the longitude and latitude of a point on the ground at which the camera is positioned, the field of view of the camera and may even include the locations (i.e. the longitude and latitude) of each of the four corners of the expected image. Additional data may also be included in the telemetry data. Thus, this listing of variables included within the telemetry data should not be construed as exhaustive nor is every variable required for the data to be considered telemetry data.

The telemetry data is stored in a format similar to the Society of Motion Picture Television Engineers (SMPTE) Material Exchange Format (MXF). It is composed of data packets that are encoded in Key Length Value (KLV) format. A packet consists of a 16 byte key which is registered with the SMPTE and MISB. SMPTE and MISB provide KLV dictionaries that provide definitions of the various keys. Following the key is a single byte, which allows the length of the telemetry data to be determined. If the sign bit, or most significant bit, of the byte is not set, then the byte is the length of the data (value) that follows. If the most significant bit or sign bit of the length is set, then the remaining seven bits of information in this byte tells the size of the length that follows in bytes. These length bytes then tell the length of the value. The format of the data in the value is determined by the definition of the registered key. It might be floating point, integer, characters, or other data types.

The parser will parse the telemetry data file to locate the telemetry data for each data acquisition point. The parser receives a packet of data and begins parsing it by searching the binary data 16 bytes at a time 500. This is accomplished by assigning two 64 bit pointers to the data. If the first half of the data is a valid partial key, then the second half of the data is checked to determine if it is a valid part of a defined key 501. In order to provide for fast parsing of the telemetry data the keys are hardcoded in case statements certain embodiments. In other embodiments the parser performs a look-up of the data (key) in a dictionary.

If the data is not a valid key, the pointers are incremented to the next byte and the process continues until a valid key is found or the end of the buffer is reached 502.

If a valid key is found then the length of the data is determined. 503 The data is retrieved into a predefined data structure for that key and the pointer is move to the first byte beyond the data. If the key is a nested key, then the length of the highest nested key is determined and kept as a group of data or packet. The length of the nested packet and data is verified by reading the packet check sum at the end of the packet and comparing the checksum to the calculated checksum of the value up to the checksum. If the checksum is not valid, then the key is assumed to be invalid, and the search pointers are incremented one byte, so that the search for the next valid key.

If the nested container key packet is valid, the data within the key is parsed and the data is loaded into predetermined structures 504. If an invalid data structure or key is found within the packet, then the search is continued to find the next valid key by incrementing the search pointer 502. The search continues until the end of the packet is reached, or the end of the buffer occurs. If an end of buffer is reached, then the remaining unparsed data is pre-pended to the next data buffer, and the scan continues.

When the end of a high level container packet is reached, it is sent to the output processing routine and the scan pointers are moved to the data just beyond the container packet 502. If the data is not in a nested container packet, then each individual key is accounted for, and when the first repeat key is found, then the packet is sent to the output processing routine.

If nested keys are found they are processed just like any other key, but are not output until the highest level key is output. If a Local Data Set (LDS) is found, its check sum is calculated and checked against the packets checksum. LDS are composed of sets of single byte Tags instead of keys followed by a length and value (TLV). Since the tags are a single byte they cannot be scanned for like unique 16 byte keys. Instead the checksum must always be checked to verify the validity of the nested LDS. If the nested LDS is invalid, then the scan is moved forward one byte into the nested LDS, and the search for a valid 16 byte key resumes. If the checksum is valid then the LDS is processed in a serial fashion reading one TLV data set at a time. If an undefined Tag is found, or an invalid length is found, then the whole LDS is discarded. If the LDS is discarded, the scan is moved one byte into the LDS key, and the scan for the next key resumes. Scans continue until the end of all the packets are reached or end of stream (EOS).

Once a complete packet of the telemetry data is parsed and converted to a standard database structure, the timestamp of the packet is located 505 and the time stamp is verified to determine if it falls within the desired range of time 506. In the SMPTE and MISB KLV formats the time stamp occurs as the first data value. If the telemetry time stamp is outside of the desired time range, all of the telemetry data is discarded 507. If it falls within the desired range, it is sent to the telemetry sync module 508. Prior to sending the telemetry data to the telemetry sync module the telemetry data is assigned a media time. The media time for the samples is calculated based on the data captured in the KLV. The KLV timestamp maintains the time of the telemetry data. This timestamp is converted to a relative media time so the video and KLV are associated by a common time. Additionally, the telemetry timestamp may not directly synchronize with the timestamp of the video data due to clock differences between the telemetry acquisition system and the video data acquisition system. If it is determined or known that the clocks are not synchronized, the offset is added or subtracted from the timestamp. Any time corrections are also applied and stored in the data packet as the beginning time. Subsequent packets timestamps are compared to the start time to determine their relative offset into the video stream that the telemetry data corresponds. After making the necessary corrections to the timestamp, if the timestamp of the data is now outside the range of the desired time, then the data from the telemetry packet is discarded The output routine validates the timestamp of the packet to make sure it is non zero and has a reasonable value. If it is the first packet, the timestamp is saved as the starting time of the first telemetry packets (in KLV format). The process continues to locate relevant keys associated with telemetry data within the desired time period until the end of the telemetry file is reached or the end of packet for the last packet is reached. 509

Some of the data in the structure may be redundant or can be calculated from other values. For example, ground corner points may be calculated from the Euler angles, position of the sensor (i.e. the camera), field of view and a model of the Earth. As another example, the vertical or horizontal field of view may be calculated from either the vertical or horizontal field of view and the aspect ratio of the video frame. As a result, some of the data may not occur in the received data packets. Therefore, a validity check is made on the data and values which can be derived from the provided information.

The telemetry synchronization module buffers telemetry data packets by media time (i.e. the time to be displayed on the display device) and releases the telemetry data packets to the extrapolation/interpolation filter. In certain embodiments of the invention, the telemetry parser will drop any telemetry packet data that is outside of the requested acquisition time. In other embodiments, the telemetry data is passed to the telemetry synchronization module and the telemetry synchronization module will drop any telemetry data packet that are outside of the requested acquisition time. In this embodiment, the telemetry data packets within the requested acquisition time are stored in a time indexed linked list. As packets age and get out of the range of the desired media time range, they are dropped from the list. New packets are then added to the list. Thus, the system can continue to provide real-time display of the video data on a map even if video/telemetry data is missing or take too long to be passed through the pipeline processor.

The telemetry synchronization module attempts to send out packets that are slightly ahead of the scheduled media time (the media time represents the video time) so that two telemetry packets are provided to the extrapolation filter that spans the requested acquisition time.

The purpose of the extrapolation/interpolation module is to calculate data values for a requested acquisition time requested by a user. The extrapolation filter may use a simple slope intercept formula ($y=m*x+b$) to calculate desired data values. Other methods for interpolation may be used including other known linear and non-linear techniques. If the value of the calculated data falls outside the range of the permissible value of the data, it is corrected appropriately. For example an angle value which could range from 0 to 360 degrees, might result in a calculated value of 370 degrees. It would be adjusted to 10 degrees.

The coordination and scheduling between the telemetry synchronization module and the interpolation filter usually results in the requested time being between the two time stamps of the two stored data packets received from the telemetry synchronization module. This is usually possible because the KLV data can be process many hundreds of time faster than the video data due to the size and complexity of the decompression algorithm. Thus, the extrapolation filter acts as an interpolator. If the requested time is before or after both stored values, then the calculated value is an extrapolation. For instance, at the end of the video data file, it is possible that there is only a single corresponding telemetry data time stamp that occurs before the time stamp of the video data frame and therefore, extrapolation rather than interpolation would be necessary. For example, the time stamp of the last video frame may be at 30 minutes and 9 seconds. The final telemetry data time stamp may be at 30 minutes and 5 seconds. As a result, a telemetry value for a time of 30 minutes and 9 seconds would need to be extrapolated from temporally earlier telemetry data acquisitions. The extrapolation may be performed using linear and non-linear extrapolation techniques known to one of ordinary skill in the art. It should also be understood that the processing of the video data and the telemetry data is asynchronously processed. As a result the telemetry data could be far behind or ahead of the video data. As a result, in order to provide for real-time display, situations can occur in which telemetry data exists that could be used for interpolation, but because of processing limitation extrapolation is necessary. As an example, within the KLV telemetry data stream there exists telemetry data for a time stamp of 20 minutes 0 seconds and one for 20 minutes and 10 seconds. Video data having a time stamp of 20 minutes and 5 seconds is scheduled to be displayed, however telemetry data only exists for 20 minutes and 0 seconds and the 20 minutes and 10 second telemetry data has not yet been parsed. As a result, the extrapolation/interpolation module will interpolate telemetry data for 20 minutes 5 seconds based at least upon the telemetry data at 20 minutes 0 seconds. After the extrapolation/interpolation module, the corresponding telemetry data and video data are provided to the map rendering module.

Figure 6:
FIG. 6 is a rendering of a graphical user interface and map with video data overlaid for a single aerial vehicle.

The map rendering module takes the coordinates from the telemetry data and calculates the corresponding screen coordinates for display. performing a view space transform on the video data. The view space transformation maps the corners of the each video image to corresponding longitude and latitude coordinates on a map grid. To do this the location of the sensor must be provided. Either the Euler angles must be provided or derived from relative sensor information. Either a math model of the Earth or an elevation model is used to determine the intersection of the view cone of the sensor with the Earth. The transformed video data is then output to the display device and overlays a map as shown in FIG. 6. On the left of FIG. 6 is shown, a map with the captured video imagery 610 is being displayed as an overlay. In this configuration the video data may be overlaid in substantially real-time from the aerial aircraft, wherein images will be overlaid on the map as time progresses. On the right of FIG. 6 is shown a graphical user interface 620 that displays the actual aerial video data in real-time. In this figure a time line 630 is presented wherein the video image being displayed is at approximately 31 seconds into the video. Thus, the left hand image shows the first 31 seconds of captured imagery from the aerial vehicle.

Figure 7:
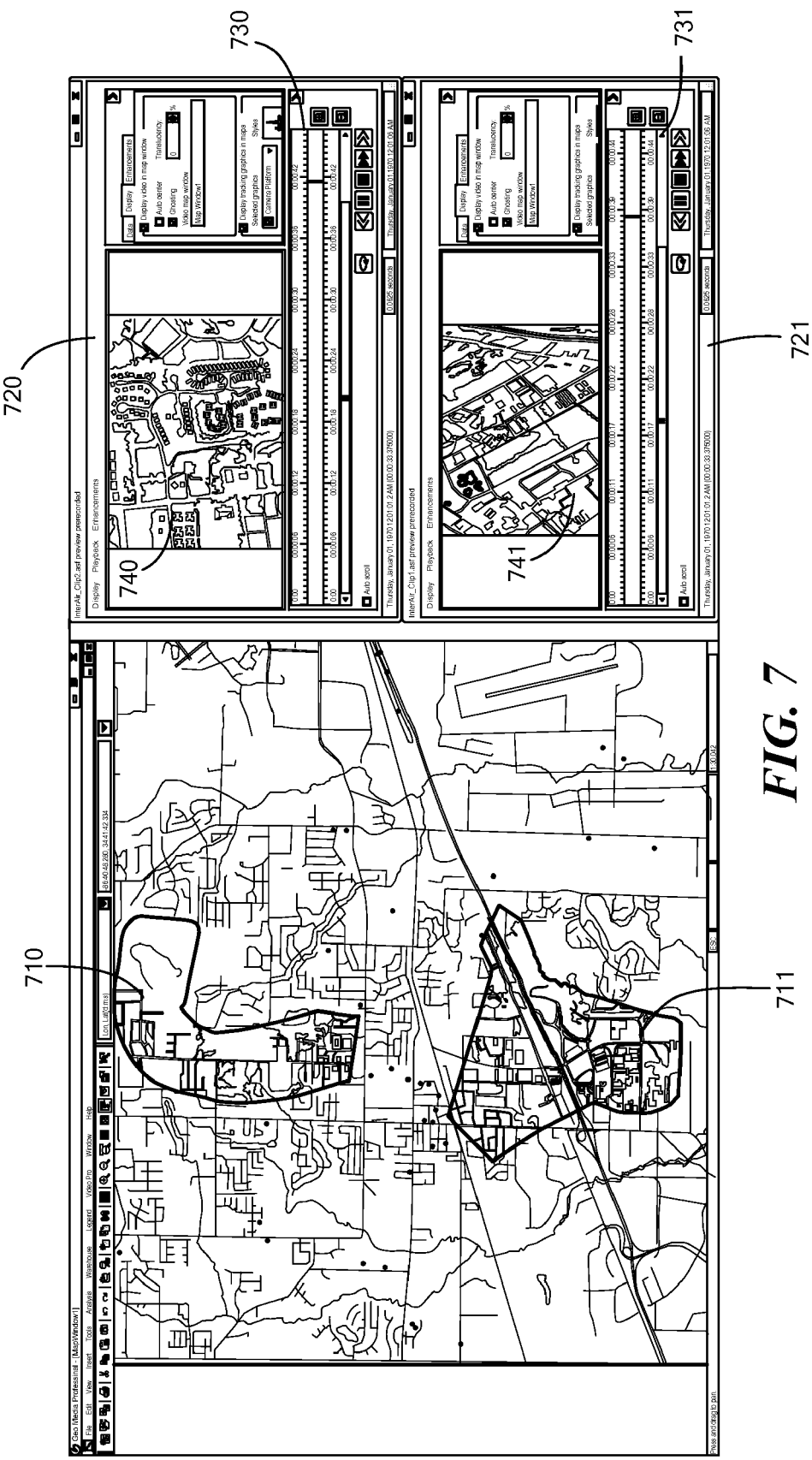
FIG. 7 is a rendering of the graphical user interface and map with video data overlaid for two aerial vehicles.

FIG. 7 shows another rendering of video data being overlaid on a map. However, for FIG. 7 the video 710, 711 from two aerial vehicles are overlaid simultaneously on the map instead of a single aerial vehicle as shown in FIG. 6. Each map display is handled by a unique instance of the video control module 174 as shown in FIG. 1A. An application layer above the video control determines the number of instances of the video control, when they are started, stopped, and their playback rate. The map rendering module allows for multiple videos to be drawn via a known representation protocol, such as via DirectX surfaces. The video control module can be implemented as a multi-threaded application in which each instance of the control is in a separate thread. The threads and therefore the video control modules are synchronized against a master clock 180 as shown in FIG. 1A. The control module controls the display of data from the map rendering module, but also signals to the rendering module when to drop frames. For example, the control module may signal for frames to be dropped from a video from a first aerial vehicle if the video is out of synchronization with a video from a second aerial vehicle. The control module 174 controls the ability to add multiple videos for display and is responsible for starting each instance of the video control for that video.

The right side of the figure shows the graphical user interface 720, 721 along with a timeline 730, 731 for each aerial vehicle. The video image 740 for the top aerial vehicle occurs at approximately 41 seconds. It should be understood that although the time line show approximately 41 seconds of data have been displayed, this may be a subsection of all of the video that has been captured by the aerial vehicle. The video data being displayed may be from a saved telemetry and video file combination, and thus the information displayed may simply be a subsection of that video file. In other embodiments, the video being overlaid may be presented in substantially real-time from the time when the aerial vehicle acquires the data. Thus, the system receives in a real-time transmitted stream from the aerial vehicle(s) and processes the information for synchronization and overlay on a map. The two aerial vehicle video data streams 740, 741 may come both from real-time acquisition, both from saved files, or one from a real-time acquisition and one from a previously acquired file.

Initially, the video data will be processed and displayed on the map in real-time such that frames of video data will be added and overlaid on the map sequentially. Once the video and telemetry data files are synchronized the video data that was captured over a temporal period can be directly and immediately displayed on the map without having to wait a period of time equal to the time that the video was captured. For example, if the video from the upper right was previously captured and synchronized with the telemetry data, all of the video frames could be placed on the map in near real-time accounting for the time necessary to perform the view-space transformation if the view-space transformed video data was not previously saved to memory. Further, multiple files may be placed on the map simultaneously and in combination with video data that is being received in real-time from one or more aerial vehicles.

Additionally, as the video images are placed on the map, the images may be blended together to form a mosaic. As such, the images persist on the display and provide a trail showing the flight path of the aerial vehicle. A composite image of the flight path can be created and saved to memory. The blending is achieved by taking an average of the images where the images overlap. When images are blended together taking the average, moving objects on the ground are usually averaged out of the image. However, the resulting ground image has an apparent higher resolution than simply overlaying the newest information on the display.

It is to be understood that different parts and components of the method and system described above can also be implemented independent of each other and be combined in different form. Furthermore, the above described embodiments are to be construed as exemplary embodiments only.

It should be recognized by one of ordinary skill in the art that the foregoing methodology may be performed in a computer processing system and the computer processing system may include one or more processors for processing computer code representative of the foregoing described methodology. The computer code may be embodied on a tangible computer readable medium i.e. a computer program product.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an embodiment of the present invention, predominantly all of the reordering logic may be implemented as a set of computer program instructions that is converted into a computer executable form, stored as such in a computer readable medium, and executed by a microprocessor within the array under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

We claim:

1. A system for synchronizing unsynchronized encoded aerial video data and separately acquired telemetry data for generation of a map containing the aerial video data, each sample of the telemetry data having an associated acquisition time, the system comprising: a telemetry parser for receiving a targeted acquisition time period and a telemetry data stream, the telemetry parser parsing the telemetry data stream to locate a targeted telemetry data, wherein the targeted telemetry data is the telemetry data temporally proximate or within the targeted acquisition time period; a video frame extraction module for accessing an encoded aerial video data stream, the video frame extraction module decoding a portion of the encoded aerial video data stream into targeted video frames, each frame having an associated video frame time, wherein the targeted video frames are temporally proximate to or within the targeted acquisition time period; a synchronization module for synchronizing the targeted telemetry data and the targeted video frames based upon the associated acquisition time and video frame time; and a filter for producing additional telemetry data so that there is telemetry data that corresponds to each video frame within the targeted acquisition time period.

2. The system according to claim 1 further comprising: a graphical user interface outputting a targeted acquisition time period of video data for display.

3. The system according to claim 1, wherein the encoded aerial video data stream is parsed to locate data based upon a presentation timestamp for a group of video frames temporally proximate to or within the targeted time period.

4. The system according to claim 1, wherein the telemetry data is sampled at a rate that is longer than a sample rate for the video frame data.

5. The system according to claim 1 further comprising:
a rendering module for producing a map wherein the video frame data is spatially transformed from an aerial acquisition plane to a map plane and the transformed video frame data is inserted into the map based upon the telemetry data associated with the video frame data.

6. The system according to claim 1 further comprising:
memory for storing the telemetry data stream into a telemetry file and for storing the encoded aerial video data stream into an aerial video file.

7. The system according to claim 1, wherein the telemetry data is encoded in Key Length Value format.

8. The system according to claim 1, wherein the telemetry parser parses a first known key byte size of data and places a first and second portion of the data into at least a first and a second buffer, the telemetry parser checks telemetry data within the first buffer for a first partial key value and upon the telemetry data representing a valid partial key, the parser checks the telemetry data in the second buffer for a second partial key value.

9. The system according to claim 1 wherein the video frame extraction module will discard any MPEG-encoded data associated with a presentation time stamp that is not within a targeted time range.

10. A method for parsing a targeted portion of telemetry data from a telemetry data file stored in key length value format based upon a targeted temporal period, the method comprising: receiving a first section of the telemetry data file; comparing the first section of the telemetry data file to an identified key; upon the first section of the telemetry data file matching the identified key: identifying the length associated with the desired key; comparing a time stamp within the telemetry data to the targeted temporal period; upon the time stamp being temporally proximate or within the temporal period, saving data of a length equal to the identified length to a database structure based upon the identified key; and upon the time stamp not being temporally proximate to or within the temporal period, discarding the telemetry data associated with the key and incrementing to a next byte of data from the telemetry data file.

11. The method according to claim 10, wherein the database structure for the data saved equal to the identified length includes indicia of a ground location.

12. The method according to claim 10, wherein the database structure for the data saved equal to the identified length includes an identifier for longitude and latitude of a ground location.

13. A method for synchronizing a targeted portion of a telemetry data file and a targeted portion of a separately acquired encoded video file, the method comprising: receiving into a processor a data segment of a telemetry data file; comparing the data segment of the telemetry data file to an identified key; upon the data segment of the telemetry data file not matching the identified key: incrementing to a next byte of data and repeating receiving and comparing; upon the first section of the telemetry data file matching the identified key: identifying a length identifier associated with the desired key; identifying a telemetry time stamp within the telemetry data; upon the telemetry time stamp being temporally proximate or within a user-defined temporal period, saving data from the telemetry data file of a length equal to the identified length to a database structure in memory based upon the identified key; upon the telemetry time stamp not being temporally proximate to or within the user-defined temporal period, discarding the telemetry data associated with the key and incrementing to a next byte of data from the telemetry data file and repeating receiving, comparing, identifying and saving; receiving a data segment of an encoded video data file; for each presentation time stamp identified within the data segment of the encoded video data file, determining if a presentation time is proximate to or within the user-defined temporal period; upon the presentation time stamp being proximate to or within the user-defined temporal period, decoding video data and identifying frame time stamps for each video frame and saving to memory the video frames within the user-defined temporal period; synchronizing the telemetry data stored in memory with the video frames stored in memory based upon the user-defined temporal period; and storing the synchronized telemetry data and corresponding video frames to memory.

14. The method according to claim 13, further comprising:
view space transforming the video frames stored in memory based upon the synchronized telemetry data; and
rendering the view space transformed video frames on display with a map.

15. A method for parsing encoded video data to locate one or more video frames that have a targeted time period, the method comprising: receiving encoded video data into a processor; locating an approximate time stamp associated with a presentation time stamp; comparing the approximate time stamp to the targeted time period: upon the approximate time stamp being proximate to or within the targeted time period, decoding a group of encoded video frames and identifying a frame time stamp for each decoded video frame; and upon the frame time stamp being within the targeted time period, storing the associated frame and corresponding frame time stamp to memory for later retrieval.

16. A method according to claim 15, wherein the encoded video data is encoded in an MPEG format.

17. A method according to claim 15 wherein the approximate time stamp is an estimate of playback time and is associated with an identifiable range.

18. A method according to claim 15, further comprising: receiving the targeted time period from a look-up module wherein the look-up module receives as input a map location and identifies the targeted time period for an encoded video data file based on a flight path for an aerial vehicle acquiring the encoded video data file.

19. A method according to claim 15 wherein the encoded video data is encoded in an MPEG-2 format.

* * * * *